(12) United States Patent
Sharma et al.

(10) Patent No.: US 11,048,490 B2
(45) Date of Patent: **\*Jun. 29, 2021**

(54) SERVICE PLACEMENT TECHNIQUES FOR A CLOUD DATACENTER

(71) Applicant: BMC Software, Inc., Houston, TX (US)

(72) Inventors: Abhijit Sharma, Pune (IN); Nilesh Phadke, Pune (IN); Alexander Vul, Palo Alto, CA (US); Varun Karnati, Miryalaguda (IN); Rajesh Kamineni, Warangal (IN)

(73) Assignee: BMC Software, Inc., Houston, TX (US)

(*) Notice: Subject to any disclaimer, the term of this patent is extended or adjusted under 35 U.S.C. 154(b) by 652 days.

This patent is subject to a terminal disclaimer.

(21) Appl. No.: 15/954,037

(22) Filed: Apr. 16, 2018

(65) Prior Publication Data

US 2018/0232220 A1 Aug. 16, 2018

Related U.S. Application Data

(63) Continuation of application No. 13/874,202, filed on Apr. 30, 2013, now Pat. No. 9,946,527.

(30) Foreign Application Priority Data

Mar. 15, 2013 (IN) .......................... 1127/CHE/2013

(51) Int. Cl.
*G06F 8/60* (2018.01)
*G06F 9/50* (2006.01)

(52) U.S. Cl.
CPC .............. *G06F 8/60* (2013.01); *G06F 9/5066* (2013.01); *G06F 2209/502* (2013.01)

(58) Field of Classification Search
CPC ................................. G06F 8/60; G06F 9/5066
See application file for complete search history.

(56) References Cited

U.S. PATENT DOCUMENTS 6,321,240 B1 11/2001 Chilimbi et al.
8,782,242 B2 7/2014 Ahmad et al.
(Continued)

OTHER PUBLICATIONS

"Building the virtualized enterprise with VMware infrastructure," 2006, VMware Inc., 18 pages (Year: 2006).*
(Continued)

*Primary Examiner* — Kamini S Shah
*Assistant Examiner* — Russell L Guill
(74) *Attorney, Agent, or Firm* — Brake Hughes Bellermann LLP

(57) ABSTRACT

A container set manager may determine a plurality of container sets, each container set specifying a non-functional architectural concern associated with deployment of a service within at least one data center. A decision table manager may determine a decision table specifying relative priority levels of the container sets relative to one another with respect to the deployment. A placement engine may determine an instance of an application placement model (APM), based on the plurality of container sets and the decision table, determine an instance of a data center placement model (DPM) representing the at least one data center, and generate a placement plan for the deployment, based on the APM instance and the DPM instance.

20 Claims, 14 Drawing Sheets

(56) References Cited

U.S. PATENT DOCUMENTS

| | | | |
|---|---|---|---|
| 2008/0295094 A1 | 11/2008 | Korupolu et al. | |
| 2009/0070771 A1* | 3/2009 | Yuyitung | G06Q 10/06 718/105 |
| 2010/0031247 A1* | 2/2010 | Arnold | G06F 8/61 717/174 |
| 2011/0173327 A1* | 7/2011 | Chen | G06F 9/5066 709/226 |
| 2012/0110056 A1 | 5/2012 | Van Biljon et al. | |
| 2013/0042003 A1* | 2/2013 | Franco | G06F 9/45558 709/226 |
| 2014/0019968 A1* | 1/2014 | Deng | G06F 9/45558 718/1 |

OTHER PUBLICATIONS

First Examination Report for Indian Patent Application No. 1127/CHE/2013, dated Jun. 17, 2020.
Alhusaini et al.: "A Framework for Mapping with Resource Co-Allocation in Heterogeneous Computing Systems"; Proceedings of the 9th Heterogeneous Computing Workshop, 2000; pp. 1-14.
Bonde: "Techniques for Virtual Machine Placement in Clouds"; Indian Institute of Technology, 2010; pp. 1-17.
Brandic et al.: "High-Level Composition of QoS-aware Grid Workflows: An Approach that Considers Location Affinity"; Workshop on Workflows in Support of Large-Scale Science, 2006; 10 pages.
Jayasinghe et al.: "Improving Performance and Availability of Services Hosted on IaaS Clouds with Structural Constraint-aware Virtual Machine Placement"; 2011 IEEE International Conference on Services Computing, pp. 72-79.
Kartik et al.: "Task Allocation Algorithms for Maximizing Reliability of Distributed Computing Systems"; IEEE Transaction on Computers, vol. 46, No. 6, Jun. 1997; pp. 719-724.
Korupolu et al.: "Coupled Placement in Modern Data Centers"; IEEE International Symposium on Parallel & Distributed Processing, 2009; 12 pages.
Larsson et al.: "Scheduling and Monitoring of Internally Structured Services in Cloud Federations"; IEEE Symposium on Computers and Communications, 2011; pp. 173-178.

* cited by examiner

SERVICE PLACEMENT TECHNIQUES FOR A CLOUD DATACENTER

CROSS REFERENCE TO RELATED APPLICATIONS

This application is a continuation of, and claims priority to, U.S. patent application Ser. No. 13/874,202, filed on Apr. 30, 2013, now U.S. Pat. No. 9,946,527, which claims the benefit under 35 U.S.C. § 119 of Indian Patent Application 1127/CHE/2013, filed on Mar. 15, 2013, and titled, "SERVICE PLACEMENT TECHNIQUES FOR A CLOUD DATACENTER," the disclosures of which are incorporated by reference herein in their entireties.

TECHNICAL FIELD

This description relates to service deployments in cloud data centers.

BACKGROUND

Software service providers seek to profit or otherwise benefit from providing their services, e.g., over a network, to a group of consumers or other users. Such service providers may often utilize Cloud datacenters to provide necessary hardware/software platforms to enable the providing of specified software services. Through the use of such Cloud data centers, service providers may reach a large audience, with a relatively small investment, while providing their services in a secure, reliable, efficient, and flexible manner.

In utilizing such Cloud data centers, the service provider may be required to define a deployment plan for a given software service, based, e.g., on the relevant service level constraints desired to be met, and on available hardware/software resources. For example, such constraints may include a response time, throughput, availability, disaster recovery, performance, and various other additional or alternative constraints.

However, it may be difficult for the service provider to take into account an impact of an underlying physical topology of a given Cloud data center, particularly for large-scale service deployments. Similarly, it may be difficult for the service provider to determine a suitable deployment for a given service, given that the service may require contradictory service constraints, particularly, again, in the case of large-scale service deployments. Moreover, even to the extent that suitable deployment plans may be determined, it may be difficult to extend or otherwise update the deployment plan, e.g., such as when attempting to accommodate newly-specified service constraints or other changes.

Consequently, for these and other reasons, it may be difficult for a service provider to determine a suitable deployment and placement out of a given service with respect to available hardware/software resources of the Cloud data center. Further, the provider of the Cloud data center itself may experience an inefficient use of resources, as well as a potential dissatisfaction of its customer base, i.e., providers of software services. As a result, service consumers themselves may suffer from undesirable reductions in a quality of services being provided, and/or relative increases in cost for the provided services.

SUMMARY

According to one general aspect, a system may include instructions stored on a non-transitory computer readable storage medium and executable by at least one processor. The system may include a container set manager configured to cause the at least one processor to determine a plurality of container sets, each container set specifying a non-functional architectural concern associated with deployment of a service within at least one data center. The system may include a decision table manager configured to cause the at least one processor to determine a decision table specifying relative priority levels of the container sets relative to one another with respect to the deployment. The system may include a placement engine configured to cause the at least one processor to determine an instance of an application placement model (APM), based on the plurality of container sets and the decision table, determine an instance of a data center placement model (DPM) representing the at least one data center, and generate a placement plan for the deployment, based on the APM instance and the DPM instance.

According to another general aspect, a method may include determining a plurality of container sets, each container set specifying a non-functional architectural concern associated with deployment of a service within at least one data center. The method may include determining a decision table specifying relative priority levels of the container sets relative to one another with respect to the deployment. The method may include determining an instance of an application placement model (APM), based on the plurality of container sets and the decision table, and determining an instance of a data center placement model (DPM) representing the at least one data center. The method may include generating a placement plan for the deployment, based on the APM instance and the DPM instance.

According to another general aspect, a computer program product may include instructions recorded on a non-transitory computer readable storage medium and configured to cause at least one processor to determine a plurality of container sets, each container set specifying a non-functional architectural concern associated with deployment of a service within at least one data center, and determine a decision table specifying relative priority levels of the container sets relative to one another with respect to the deployment. The instructions, when executed, may be further configured to determine an instance of an application placement model (APM), based on the plurality of container sets and the decision table, and determine an instance of a data center placement model (DPM) representing the at least one data center. The instructions, when executed, may be further configured to generate a placement plan for the deployment, based on the APM instance and the DPM instance.

The details of one or more implementations are set forth in the accompanying drawings and the description below. Other features will be apparent from the description and drawings, and from the claims.

DETAILED DESCRIPTION

Figure 1:
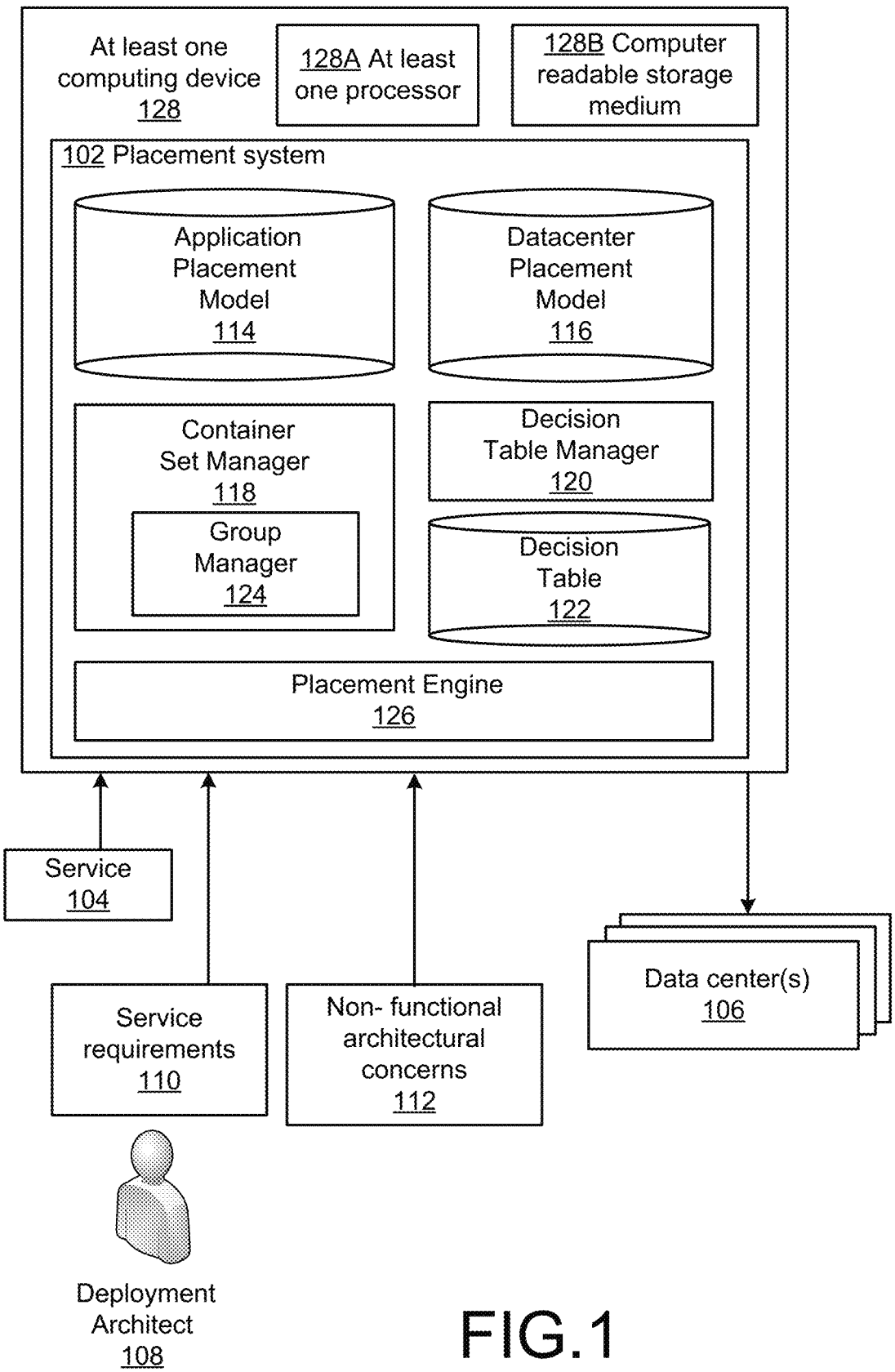
FIG. 1 is a block diagram of a system for providing service placements in Cloud data center environments.

FIG. 1 is a block diagram of a system 100 for service placement in Cloud data center environments. More specifically in the example of FIG. 1, a placement system 102 is operable to place a service 104 within one or more data centers 106, for execution thereon. More particularly, the placement system 102 may operate in a manner that considers a logical topology (i.e., functional model) of the service 104, as well as a physical topology of the one or more data centers 106. Further, as also described in detail herein, the placement system 102 may operate to enable a deployment architect 108 to specify service requirements 110 and non-functional architectural concerns 112 in a manner that is straightforward and easy to implement, yet expressible in a machine processable manner for use by the placement system 102.

As a result of these and other features of the placement system 102, the deployment architect 108 may be enabled to design and execute a placement of the service 104 in the context of the data center 106, with a relative minimum of efforts/technical knowledge. At the same time, the placement system 102 enables efficient usage of hardware/software resources of the data center 106. Further, users of the service 104 deployed on the data center 106 may experience various related advantages, such as, e.g., cost reductions and/or overall increases in desired aspects of the service 104.

With regard to the service 104, it may be appreciated that virtually any type of application(s) that may be provided as a service using the data centers 106 should be understood to be represented by the service 104. For example, such applications may include business applications, applications designed for personal use, educational applications, or gaming applications.

Also in this regard, it may be appreciated that the service requirements 110 may vary greatly, depending upon a nature and type of the underlying service 104. That is, the service requirements 110 should be understood to reflect functionalities required by the service 104 to perform their intended purpose, including required or desired platform elements, such as processing power/speed and amount of available memory.

For example, some applications may require more or less computing power or available memory than others. Similarly, some applications may require, or benefit from, separate implementations of web servers, application servers, and associated databases as described in detail below with respect to the example of FIG. 5. The service requirements 110 also may include a large number and variety of requirements which are highly specific to the type and nature of the underlying service 104. In as much as it has already been explained that an exhaustive listing of possible services 104 is beyond the scope of this description, it should also be appreciated that correspondingly-specific service requirements are also not described here in detail.

In contrast to the service requirements 110, the non-functional architectural concerns 112 generally refer to requirements or constraints associated with implementation of the service 104 using the data centers 106. For example, the non-functional architectural concerns 112 may relate to a required response time, throughput, or availability level of the service 104 when deployed using the data centers 106. Other examples of the non-functional architectural concerns 112 include, e.g., security, redundancy, load balancing, disaster recovery, and quality of service (QoS). Such non-functional architectural concerns 112 thus may be understood to relate generally to inherent shortcomings or non-ideal aspects of the data centers 106 and/or associated networks, and are therefore generally less specific with regard to aspects of the service 104 itself, although there may be overlapping concerns between certain service requirements and non-functional architectural concerns.

Although such non-functional architectural concerns 112, by themselves, are generally well known, and are therefore not described here in greater detail except as may be necessary or helpful in understanding operations of the system 100, it may be appreciated from the present description that the placement system 102 provides the deployment architect 108 with an ability to express the non-functional architectural concerns 112 in a manner that is straightforward, does not require extensive technical knowledge, and scales easily to large-scale deployment of the service 104 within the data centers 106. Moreover, as also described, the placement system 102 provides for the expression of the non-functional architectural concerns 112 in a manner that is generally machine-processable, and extensible to include newly-added non-functional architectural concerns 112, even when two or more of the non-functional architectural concerns conflict with one another.

More specifically, and as shown, the placement system 102 may utilize an application placement model (APM) 114, which enables the deployment architect 108 to individually express individual ones of the non-functional architectural concerns 112. That is, the deployment architect 108 may specify a single, discrete non-functional architectural concern, without immediate regard for an effect of, or interaction with, other non-functional architectural concerns. The deployment architect 108 may repeat the process of providing individual ones of the non-functional architectural concerns 112, until all current non-functional architectural concerns have been received by the placement system 102 in accordance with the underlying application placement model 114. A specific example of the application model 114 is illustrated and described below with respect to FIG. 3.

Meanwhile, a data center placement model (DPM) 116 represents a model which the deployment architect 108 may utilize that expresses and represents a logical and physical topology from the data center 106. Specifically, for example, each data center 106 may be expressed within the data center placement model 116 as being associated with a plurality of hierarchical levels, so that hardware/software at each level is inclusive of a plurality of components of hardware/software at one or more corresponding levels. An example of such a level-based topology for the data centers 106 is provided by the example data center placement model 400 shown and described with respect to FIG. 4.

In the example of FIG. 1, each of the non-functional architectural concerns 112 may be separately expressed using a data structure of the application placement model 114 that is referred to herein as a "container set" that is described in more detail below, e.g., with respect to FIG. 3. Each container set corresponds to a specific non-functional architectural concern (e.g., availability, connectivity, or QoS).

Further, each container set may include one or more containers, where such a container may be correlated specifically with a particular level of the hierarchical, multi-level physical topology of the data center 106, or may be applicable to multiple (e.g., all) levels of the data center 106. For purposes of understanding the high level description of FIG. 1, it may simply be appreciated that service elements of the service 104 may be desired by the deployment architect 108 to be provided using a plurality of hardware/software platform hosts of the data center 106, and that the term container is intended generically to refer to a set of such hosts included within one or more levels of the physical topology of the data center 106, and specifying which of the service elements may or may not be included therein, as specified by the deployment architect 108. That is, for example, a set of containers may specify which service elements should or must be included in a given set of hosts, or, conversely and in other scenarios, may specify which service elements should or must be excluded from being included together within a given set of hosts.

Thus, a container set manager 118 may be understood to receive, by way of an appropriate user interface (not specifically illustrated in the simplified example of FIG. 1), specific, individual container sets (i.e., non-functional architectural concerns 112), for storage in accordance with the application placement model 114. That is, the deployment architect 108 may enter each such container sets individually, until all of the non-functional architectural concerns 112 have been received by the container set manager 118. In the context of each container set, the deployment architect 108 may define one or more containers, as just referenced.

Meanwhile, a decision table manager 120 may be configured to receive from the deployment architect 108 a plurality of relative priority levels that are defined with respect to the previously-specified container sets. In other words, the deployment architect 108 may associate a relative priority level for each container set, where the resulting priority levels are stored using a decision table 122, which itself may be part of the application placement model 114.

Meanwhile, a group manager 124 may be configured to group the various service elements of the various container sets into affinity groups and anti-affinity groups. In this regard, as referenced above and as described in detail below, the term affinity refers to the fact that some of the non-functional architectural concerns 112 express a preference or requirement for two or more service elements to be hosted in proximity to one another within the data center 106.

Conversely, then, an anti-affinity group refers to a group of service elements associated with a preference or requirement that two or more service elements be disallowed from being deployed in proximity to one another. As also described, affinity groups may specify groups of service elements across multiple deployment levels, while anti-affinity groups may be level-specific (i.e., may specify that two included service elements should not be included together at a given deployment level).

Such affinity groups and anti-affinity groups illustrate the above-referenced potential for the non-functional architectural concerns 112 to include contradictory or conflicting requirements. For example, an affinity group associated with a preference for hosting two specific service elements in close proximity to one another (e.g., to thereby enhance communications there between) may conflict with requirements of a non-affinity group that specifies that the same two service elements should be located remotely from one another (e.g., for the sake of redundancy/availability).

Thus, in operation, the group manager 124 may merge the affinity groups and the anti-affinity groups associated with the various container sets and associated containers, using the decision table 122, to thereby derive a placement plan for deploying the various service elements within the data center 106. In this way, contradictory requirements may be resolved, while still closely matching original specifications of the deployment architect 108.

Further in the example of FIG. 1, a placement engine 126 may be configured to receive the merged groups for comparison to the relevant, already-specified instance of the DPM 116 to carry out the above-referenced placement plan. That is, the placement engine 126 may be operable to compare and align the merged groups to the DPM instance corresponding to the data center 106, and thereafter search the actual data center 106 to execute the deployment of the various service elements onto corresponding hosts of the data center 106, in accordance with the determined placement plan. The details of searching the actual data center 106, once the placement plan is known, are, by themselves, well known, and are therefore not described in additional detail herein, except as may be necessary or helpful in understanding operations of the system 100 of FIG. 1.

In the example of FIG. 1, the placement system 102 is illustrated as being executed using at least one computing device 128. As shown, the at least one computing device 128 includes at least one processor 128A, as well as computer readable storage medium 128B. Of course, many other components may be included in, or associated with, the at least one computing device 128, which are not necessarily shown in the example of FIG. 1. For example, the at least one computing device 128 may include a variety of peripherals, power components, network or other communication interfaces, and any other hardware/software that is necessary or desired for performing the various operations described herein, or related operations. In particular, for example, the at least one computing device 128 may be associated with a display utilized by the deployment architect 108, in conjunction with a appropriate graphical user interface, to provide the service requirements 110 and the non-functional architectural concerns 112.

In practice, instructions/code and related data for implementing the placement system 102 may be stored using the computer readable storage medium 128B, and executed using the at least one processor 128A. Of course, as may be appreciated, a plurality of computer readable storage medium 128B and/or a plurality of processors corresponding to the at least one processor 128A may be utilized to implement some or all of the placement system 102. In particular, although the placement system 102 is illustrated as a single module within the at least one computing device 128, it may be appreciated that any two or more components of the placement system 102 may be implemented in parallel, utilizing two or more computing devices and associated processors. Similarly, any single component of the placement system 102 may itself be implemented as two or more subcomponents. Conversely, any two or more subcomponents of the placement system 102 may be combined for implementation as a single component.

Figure 2:
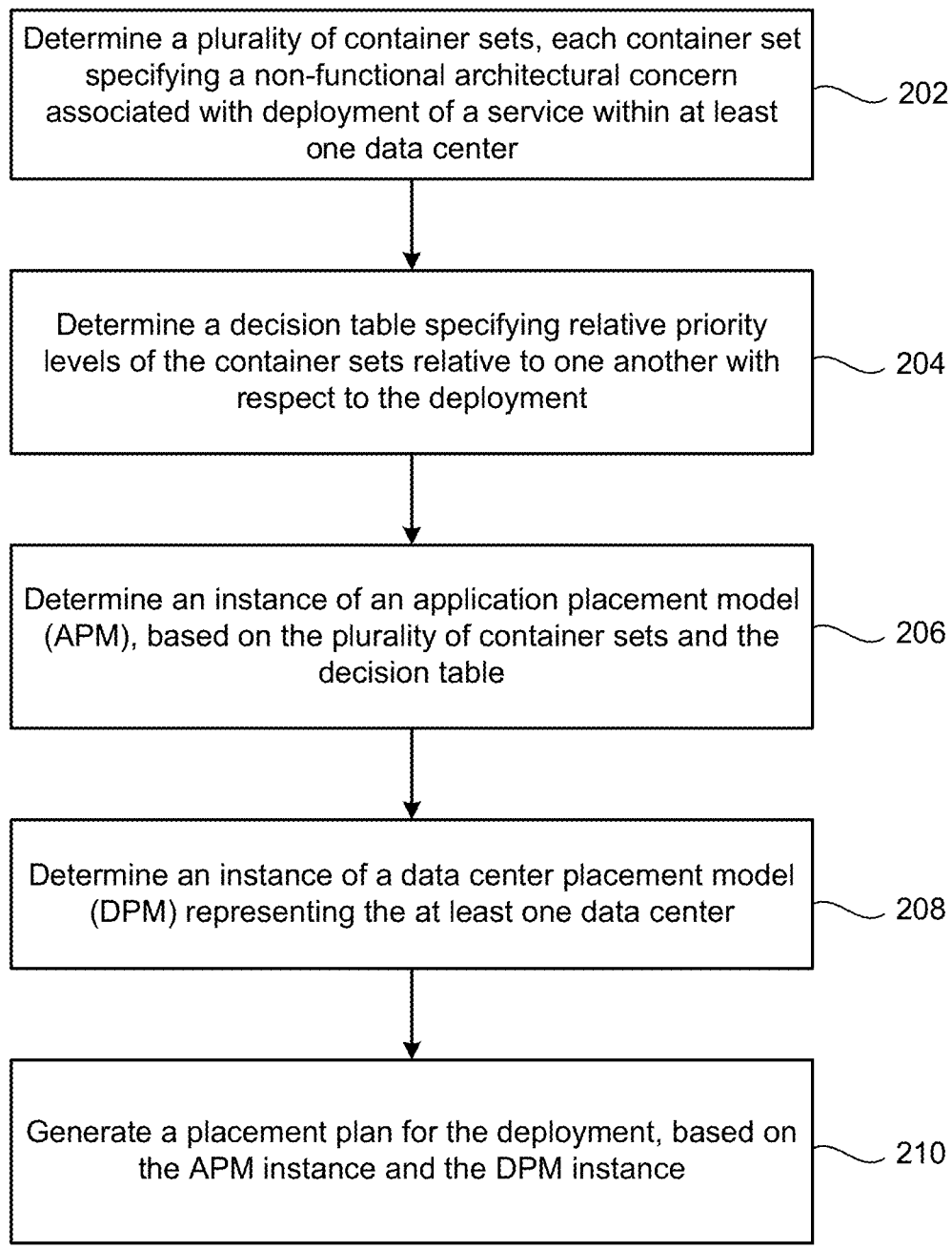
FIG. 2 is a flowchart illustrating example operations of the system of FIG. 1.

FIG. 2 is a flowchart 200 illustrating example operations of the system of FIG. 1. In the example of FIG. 2, operations 202-210 are illustrated as separate, sequential operations. In additional or alternative implementations, however, it may be appreciated that any two or more of the operations 202-210 may be executed at a partially or completely overlapping or parallel manner, and/or in a nested, iterative, or looped fashion. Further, in various implementations, additional or alternative operations may be included, while one or more of the operations 202-210 may be omitted.

In FIG. 2, a plurality of container sets may be determined, each container set specifying a non-functional architectural concern associated with deployment of a plurality of service elements within at least one data center (202). For example, the container set manager 118 of the placement system 102 may receive a plurality of container sets specified by the deployment architect 108, and individually corresponding to individual ones of the non-functional architectural concerns 112.

A decision table specifying relative priority levels of the container sets relative to one another with respect to the deployment may be determined (204). For example, the decision table manager 120 may be configured to construct a decision table 122, based on input from the deployment architect 108.

An instance of an application placement model (APM) may be determined, based on the plurality of container sets and the decision table (206). For example, the placement engine 126 may determine an instance of the application placement model 114, based on outputs of the container set manager 118 and the decision table manager 120, as well as on the output of the group manager 124.

An instance of a data center placement model (DPM) representing the at least one data center may be determined (208). For example, as described above, the container set manager 118 and/or the placement engine 124 may be aware of the data center placement model 116, and the various container sets and associated containers may be defined with respect thereto.

A placement plan for the deployment may be generated, based on the APM instance and the DPM instance (210). For example, the placement engine 124 may utilize the APM instance and DPM instance provided by the container set manager 118 and the decision table manager 120, in conjunction with the underlying models 114, 116, to thereby determine a manner in which the service 104 will ultimately be deployed to the data center 106, in a manner that closely matches the specifications of the deployment architect 108.

Figure 3:
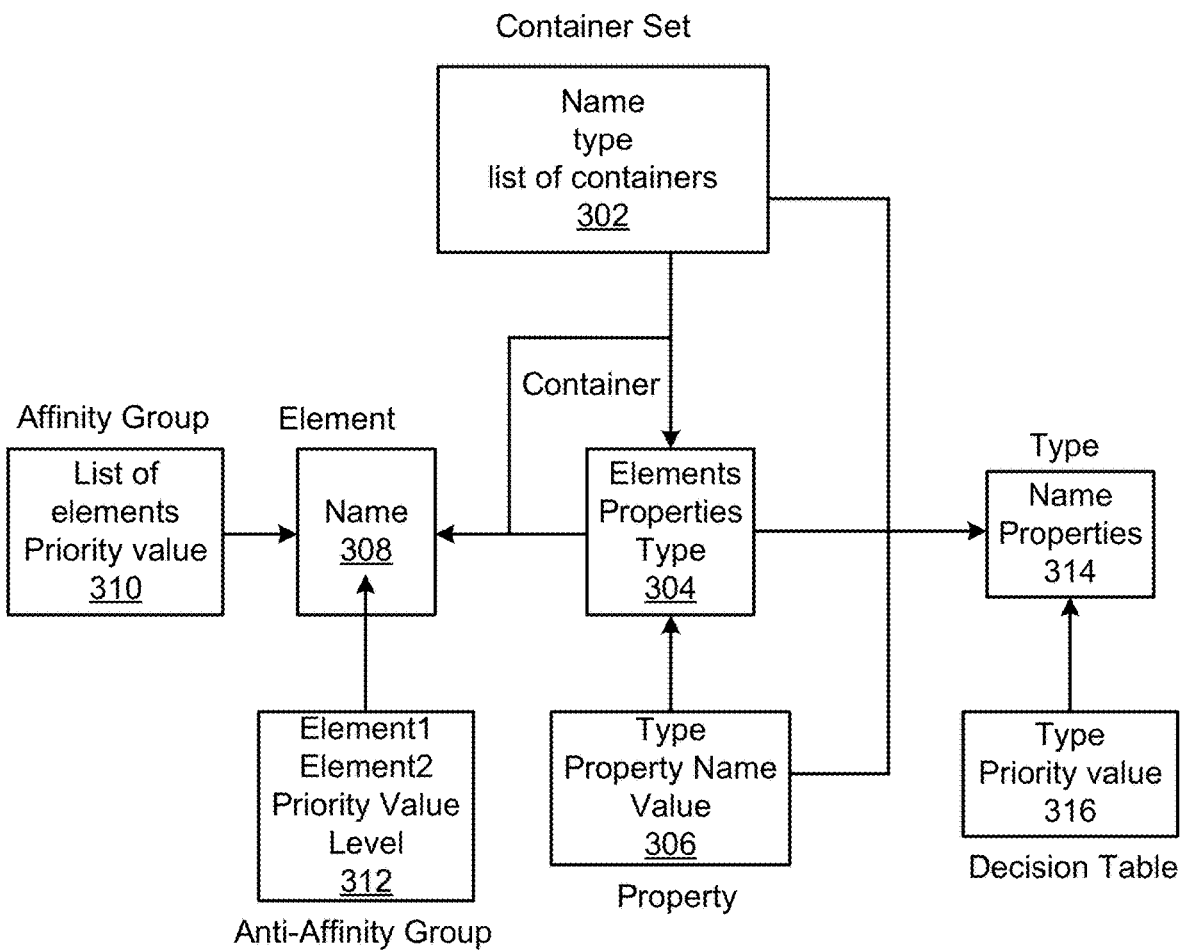
FIG. 3 is a block diagram of an application placement model utilized in the system of FIG. 1.

FIG. 3 is a block diagram of an example application placement model 300, illustrating an example of the application placement model 114 of FIG. 1. As described, the application placement model 300 accommodates expression of the various non-functional architectural concerns 112, while easily capturing new/additional constraints, and including contradictory constraints.

In the example of FIG. 3, the application placement model 300 is illustrated as including a container set 302. As described above, the container set 302 generally corresponds to a specific one of the non-functional architectural concerns 112. The container set 302 may include a name, as well as a type of the container set, corresponding to the relevant non-functional architectural concern. The container set 302 also may include a list of individual containers specified by the deployment architect 108.

As referenced above, a container(s) 304 included within the container set 302 may represent a logical entity (or entities) which contains one or more elements corresponding to service elements of the service 104, and which specifies a manner and extent to which the service elements should or should not be in proximity to one another. For example, such elements may refer to individual virtual machines used to implement service elements such as, e.g., web servers, application servers, or databases, where the virtual machines are generally implemented at a host level of the DPM 116/400 of FIGS. 1 and 4.

Each container 304 may also have a certain type and certain properties. For example, in the context of a container set related to ensuring a quality of service of the service 104, the container set 302 may include a first container having a highest possible quality of service level, and a second container having a lower quality of service. Specific properties of each container 304 also may be more specifically provided in the context of property 306, in that a name and value of the property 306 may be specified. In some examples, a given container may include multiple embedded containers, which themselves include (specify) service elements.

Each service element 308 may be provided with a specific name, and associated with an affinity group 310 or an anti-affinity group 312. As shown, the affinity group 310 may include a list of elements within the group, as well as a relative priority value indicating an extent to which the relevant affinity is required. Similarly, but conversely, the anti-affinity group 312 expresses at least two elements at a given level that are associated with a relative priority value indicating an extent to which it is important that the specified elements are not deployed at that level.

As shown, the type 314 of the container set 302 is consistent throughout the given application placement model 300, and may be associated with all relevant properties. Meanwhile, the decision table 316 may specify a relative priority value to be associated with the specific type of container set.

Figure 4:
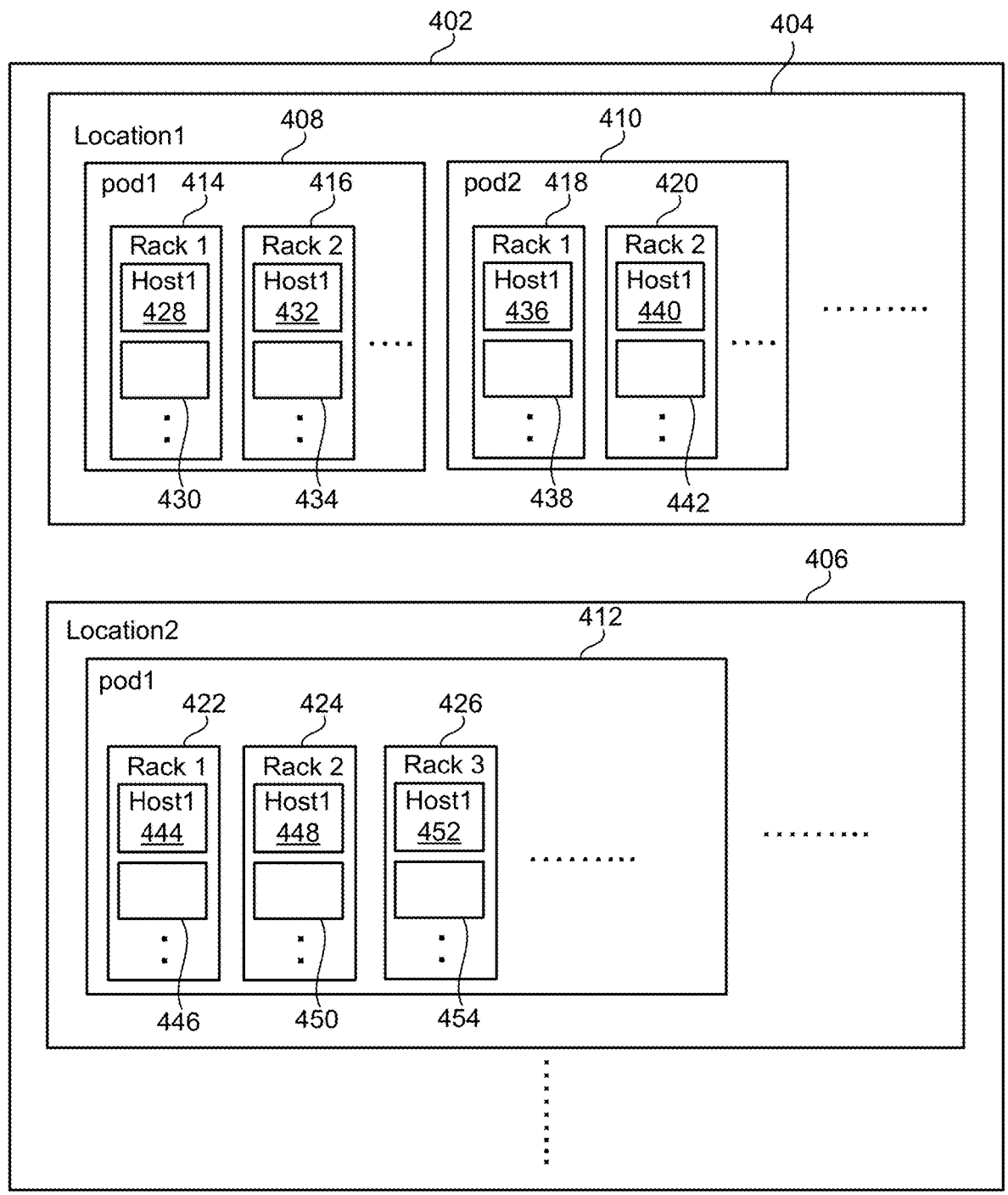
FIG. 4 is a block diagram of a data center placement model of the system of FIG. 1.

FIG. 4 is a block diagram of a data center placement model 400, corresponding to the data center placement model 116 of FIG. 1. In the example of FIG. 4, a data center 402 includes a first location 404 and a second location 406. For example, the first location 404 may be located on a first floor of the data center 402, while the second location 406 may be provided on the second floor thereof.

Within the first location 404, a pod 408 and a second pod 410 are included. Meanwhile, at the second location 406, only a single pod 412 is illustrated.

Within the first pod 408 of the first location 404, a first rack 414 and a second 416 are illustrated. Similarly, within the second pod 410 of the first location 404, a first rack 418 and a second rack 420 are illustrated. Similarly with respect to the pod 412 of the second location 406, a rack 422, a second rack 424, and a third rack 426 are illustrated.

As further shown, within the first rack 414 of the first pod 408 of the first location 404, a first host 428 and a second host 430 are illustrated. In the second rack 416 of the pod 408, a first host 432 and a second host 434 are illustrated. As further shown with respect to the second pod 410, the first rack 418 may include a first host 436 and a second host 438, while the second rack 420 includes a first host 440 and a second host 442. Finally, with respect to the pod 412 of the second location 406, the first rack 422 includes a first host 444 and a second host 446, while the second rack 424 includes a first host 448 and a second host 450, and the third rack 426 includes a first host 452 and a second host 454.

Thus, as referenced above, the data center placement model 400 should be understood to provide a model of a physical topology of the data center 402, which is hierarchical and nested in nature. That is, the particular names and components of the various levels of the data center placement model 400 should be understood as non-limiting examples, so that it should be further understood that any topology having such a hierarchical, nested structure of distinct deployment levels may be utilized.

Figure 5:
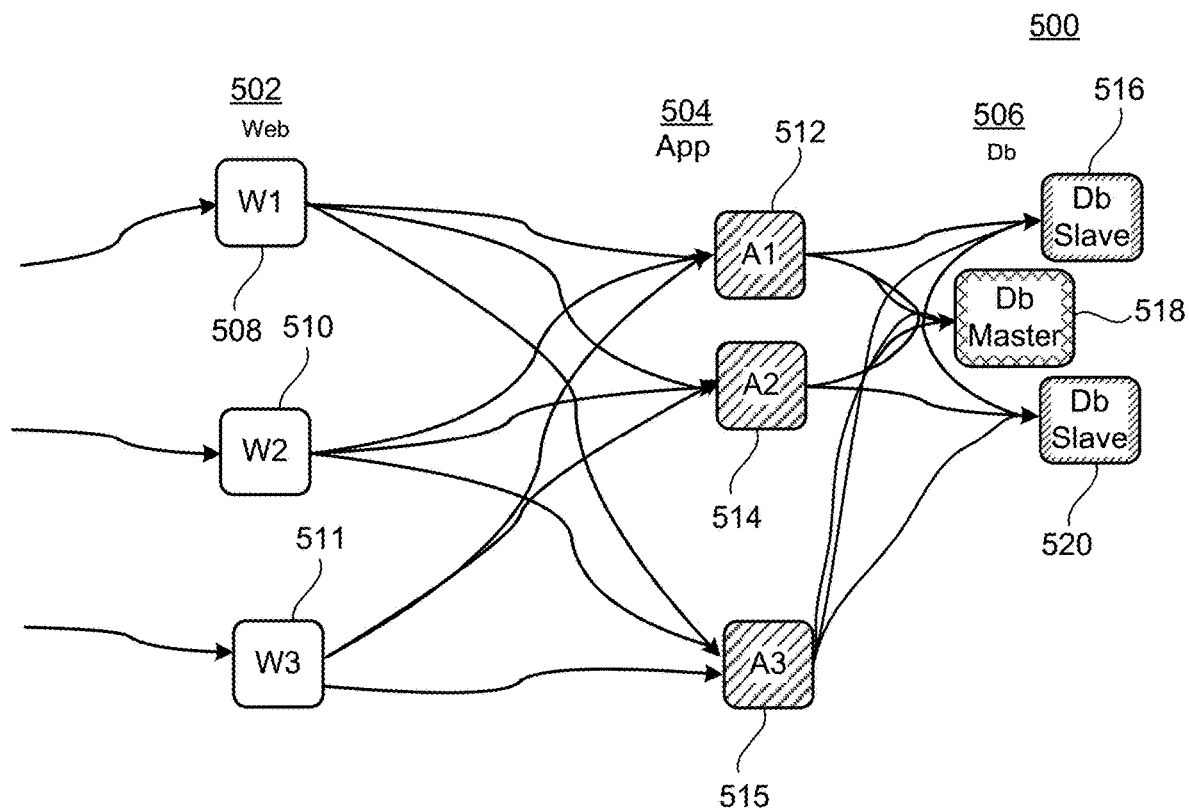
FIG. 5 is a block diagram of an example deployment blueprint that may be utilized in the system of FIG. 1.

FIG. 5 is a deployment blueprint that may be provided in an example implementation by the deployment architect 108 for an example of the service 104. In the example of FIG. 5, the service 104 is illustrated as utilizing service elements in a first layer 502 corresponding to one or more web servers, illustrated in FIG. 5 as including a web server 508, a web server 510, and a web server 511. Meanwhile, at a second layer or tier 504, application servers such as an application server 512, application server 514, and application server 515 may be provided. Finally in the example of FIG. 5, a third tier 506 illustrates a database layer which, in the example, includes databases 516, 518, 520.

In the example of the deployment blueprint 500, the deployment architect 108 may further specify various desired characteristics and constraints. For example, the deployment architect 108 may specify service level targets of, e.g., a response time less than 500 milliseconds up to a throughput of 100 transactions per minute, 95% of the time, while requiring 95% availability of the deployed service. There may be various other architectural concerns, as referenced above, e.g., disaster recovery, communication patterns, security, multi-tenancy, and others.

By way of specific example, the deployment architect 108 may wish to place at least one web server and one application server in a separate pod than the other web server or application server, in order to ensure a disaster recovery capability. It may also be desirable to place the application servers 512, 514 and the database servers 516-520 as close as possible to one another, in order to reduce communication cost and latencies. Meanwhile, the web servers 508, 510 may be required to be part of a separate security zone than the application servers 512, 514.

As described, some such concerns may contradict one another. For example, the desire for increased availability insurance may correspond to a preference for keeping, e.g., the application servers 512, 514 separate from one another, while, conversely, the desire to minimize communication cost/latencies may be associated with keeping the application servers 512, 514 close to another, and to the database servers 516-520.

Thus, FIG. 5, by itself is merely intended to represent a simplified example of a deployment blueprint 500, which illustrates that the service 104 may include a plurality of service elements to be deployed within the data center 106. FIGS. 6-16 illustrate application of the concepts of FIGS. 1-4 to the example of FIG. 5.

That is, the placement system 102 may be utilized to devise a placement plan for deploying the various service elements of the deployment blueprint 500 within the data center 106. As described above, the process of deriving such a placement plan may begin with the specification of relevant container sets by the deployment architect 108, using the container set manager 118. Consequently, FIGS. 6, 7, and 8 illustrate examples of such container sets.

Figure 6:
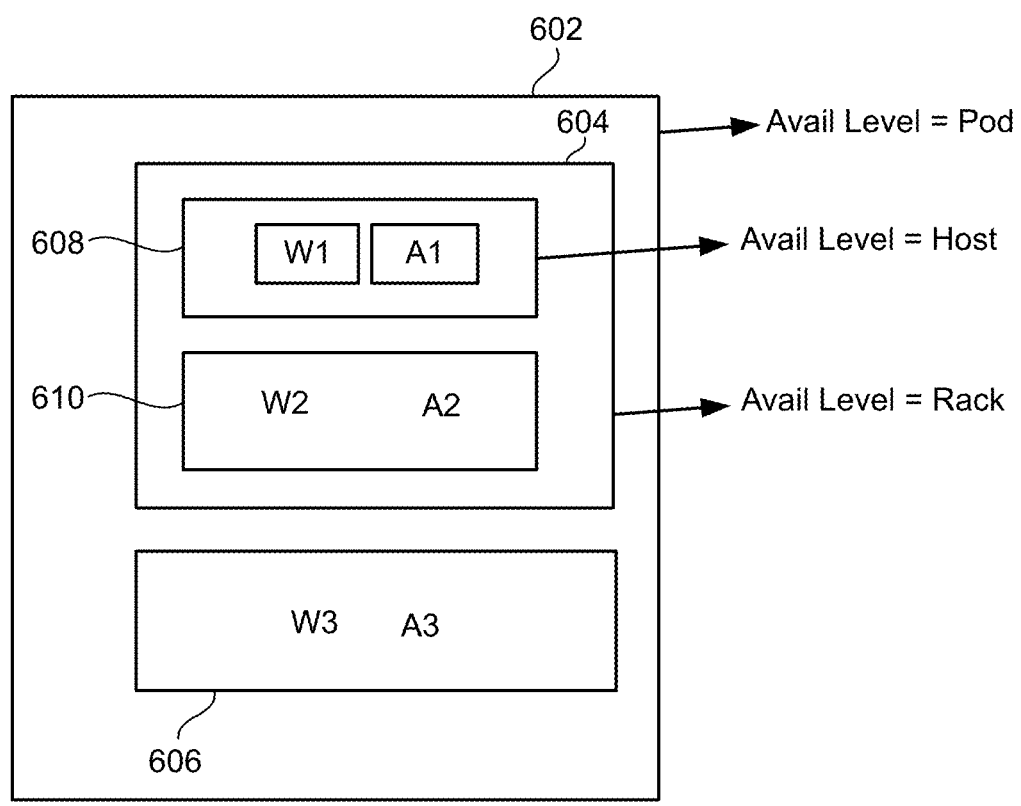
FIG. 6 is a block diagram of an example availability container set that may be used in the system of FIG. 1, and used in the example of FIG. 5.
Figure 7:
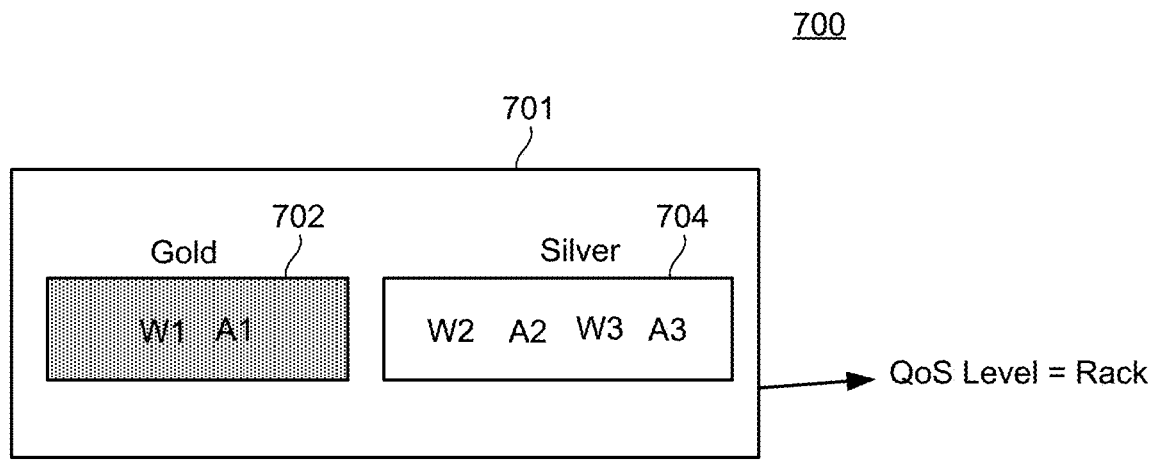
FIG. 7 is a block diagram of a quality of service (QoS) container set of the system of FIG. 1, and used in the example of FIG. 5.
Figure 8:
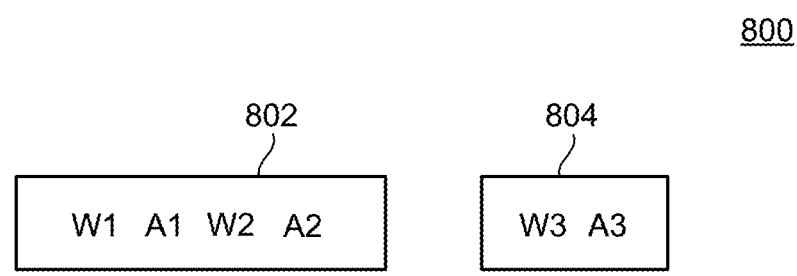
FIG. 8 is a block diagram of a connectivity container set of the system of FIG. 1, and used in the example of FIG. 5.

In the examples of FIGS. 6-8, for the sake of simplicity, only the web servers 508, 510, 511 and the application servers 512, 514, 515 are considered. Specifically, as shown, the web servers 508, 510, 511 are illustrated, respectively, as W1, W2, W3. Similarly, the application servers 512, 514, 515 are illustrated, respectively, as A1, A2, A3. Thus, although the databases 516-520 are not illustrated in the examples of FIGS. 6-8, for the sake of simplicity, it may nonetheless be appreciated that such service elements, and various other service elements, could easily be included using the techniques described herein.

With reference to the specific example of FIG. 6, an availability container set 600 is illustrated. As may be appreciated from the above description, the availability container set 600 includes a plurality of containers, where each container is a logical entity corresponding to a level of the relevant data center placement model.

For example, with reference to the data center placement model 400 of FIG. 4, it may be observed that a container 602 occurs at a pod level (e.g., pod 408, 410 or 412). Meanwhile, a container 604 is embedded within the container 602, and exists at a rack level of the data center placement model 400, along with a container 606. For example, the container 604, 606 may occur at a level of the racks 414, 416 of the pod 408 in FIG. 4. Further, containers 608, 610 are illustrated as being implemented at a host level, e.g., host 428, 430 of FIG. 4.

Thus, the purpose of the availability container set 600 is to indicate deployments that are not allowed, or that the deployment architect 108 prefers not to occur. For example, the deployment architect 108 may desire that W1 and A1 are not placed on a single host. As a result, W1 and A1 are illustrated together within the container 608 at the host level. Similarly, the deployment architect 108 may desire that W1 and A1 should not be placed on the same rack as W2 or A2. Consequently, W1/A1 and W2/A2 are illustrated within the container 604 at the rack availability level. Finally in the example, the deployment architect 108 may desire that W3 or A3 should not be placed on the same pod as any of the other servers W1, A1, W2, A2. Consequently, W3 and A3 are illustrated within the container 606 within the pod 602, and separate from the remaining servers W1, A1, W2, A2.

FIG. 7 is a block diagram of a QoS container set 700 and container 701. In the example, for performance reasons, the deployment architect 108 may desire that W1, A1 be implemented using resources tagged as gold, and thus shown within a corresponding container 702. Meanwhile, W2, A2, W3, A3 may be indicated as being placed on resources tagged as silver, as shown within the container 704. In other words, the deployment architect 108 may desire that W1, A1 are enabled to provide a higher quality of service than W2, A2, W3, A3. Assuming different service levels are provided at the rack level, then the container set 700 may be observed to be included in the container 701 at the rack level, as shown.

FIG. 8 provides a third and final example of a container set, a connectivity container set 800. That is, the connectivity container set 800 is associated with the architectural concern of reducing communications overhead. In the example, the deployment architect 108 may desire that W1, A1, W2, A2 should be placed as closely as possible to one another, as indicated by a container 802. Meanwhile, W3, A3 are similarly indicated as being desirably placed close to one another, as indicated by container 804. In contrast to the availability container set 600 of FIG. 6, in which availability containers were explicitly associated with the availability levels, the communication/connectivity containers 802, 804 may be observed to be implicitly applicable at all levels.

Figures 9, 10:
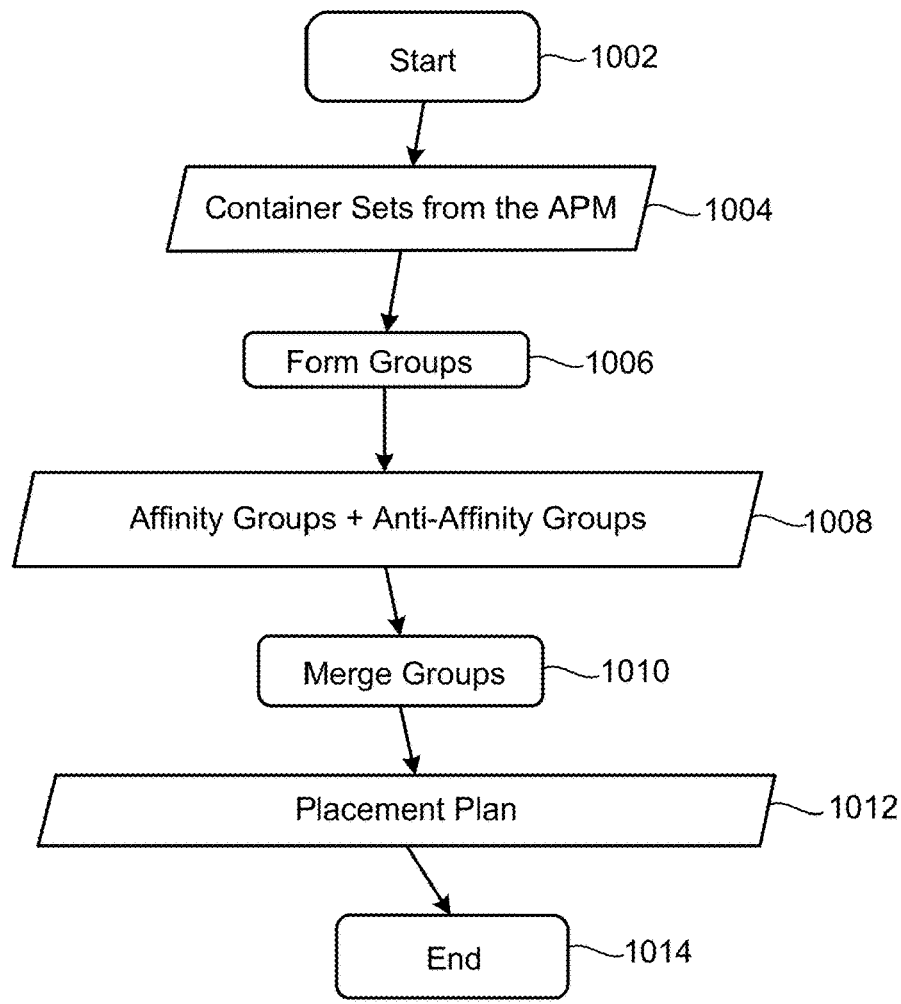
FIG. 9 is a decision table corresponding to the container sets of FIGS. 6-8.
FIG. 10 is a flowchart illustrating more detailed example operations of the system of FIG. 1, with respect to the example of FIGS. 5-9.

FIG. 9 is a decision table 900 corresponding to the example container sets of FIGS. 6-8, and providing an example of the decision table 122 of FIG. 1. In the example of FIG. 9, an entry 902 corresponds to the availability container set 600 of FIG. 6. An entry 904 corresponds to the communication container set of FIG. 8, and an entry 906 corresponds to the QoS container set 700 of FIG. 7.

As shown, each of the entries 902, 904, 906 are provided with relative priority values to be associated with each corresponding container set. As shown, the availability container set in entry 902 is assigned a priority value of 0.3, while the communication container set of the entry 904 is provided with a priority value of 0.45 and the QoS container set of the entry 906 is provided with the priority value of 0.25.

Thus, in practice, the deployment architect 108 may easily enter selected priority values for the various container sets. Moreover, since the placement system 102 is capable of automatically generating placement plans, the deployment architect 108 may easily explore various different priority values, simply by changing the contents of the entries 902, 904, 906. In this way, for example, the deployment architect 108 may implement various "what if" scenarios, in an attempt to arrive at a most desirable deployment of the service 104.

FIG. 10 is a flowchart 1000 illustrating example operations of the system 100 of FIG. 1, with respect to the example of FIGS. 5-9. In the process 1000, after a start 1002, the various container sets 600, 700, 800 from the application placement model may be determined (1004), as described above. Then, as referenced with respect to the application placement model 300 of FIG. 3, groups may be formed for each of the various container sets (1006), and classified as affinity groups or anti-affinity groups (1008).

In practice, groups correspond to container sets, so that each container set may include one or more groups of elements. As referenced above, affinity groups specify that elements in a specific group must be placed as close as possible to one another, without regard to level, in an association with a specified priority value. In contrast, anti-affinity groups are binary groups, associated with a specific anti-affinity level specifying a minimum extent of separation between the elements in the group, and associated with a priority value.

Thus, groups formed from a given container set are of a single type (e.g., either affinity or anti-affinity). For example, availability in QoS container sets result in anti-affinity groups, while the connectivity container set 800 results in affinity groups being formed. After identification of the various affinity groups and anti-affinity groups as such (1008), all the groups may be merged (1010), so that the resulting placement plan may be generated (1012), and the process 1000 may end (1014).

The following description provides more detail with respect to the group formation operation 1006 of the flowchart 1000, with regard to the example container sets 600, 700, 800. For example, the description above of the availability container sets 600 specified the example constraint that W1 and A1 should not be placed on the same host. This constraint will result in an anti-affinity group $\{W1, A1\}_H$. That is this anti-affinity group may be observed to include two elements (indicating that these two elements should not be placed together), as well as a (in this case, $_H$, standing for host) indicating the level at which the two elements are not to be deployed together. Similar logic may be used to form the following anti-affinity groups from the availability container set 600: $\{W1, A1\}_H, \{W1, W2\}_R, \{W1, A2\}_R, \{W2, A1\}_R, \{A1, A2\}_R, \{W1, W3\}_P, \{W1, A3\}_P, \{A1, W3\}_P, \{A1, A3\}_P, \{W2, W3\}_P, \{W2, A3\}_P, \{A2, W3\}_P, \{A2, A3\}_P$.

Groups may also be formed from the QoS container set 700 of FIG. 7. In FIG. 7, as described above, it is assumed that the gold and silver resources would not be on the same rack, as represented by container 701. Consequently, and by way of analogy with the anti-affinity groups described above with respect to the availability container set 600, anti-affinity groups obtained from the QoS container set 700 would include: $\{W1, W2\}_R, \{W1, W3\}_R, \{W1, A2\}_R, \{W1, A3\}_R, \{A1, W2\}_R, \{A1, W3\}_R, \{A1, A2\}_R, \{A1, A3\}_R$ Finally with respect to the connectivity container set 800 of FIG. 8, as referenced above, groups formed therefrom will be affinity groups, expressing a desire for the various elements to be placed close to one another. In the example of FIG. 8, two groups are formed, e.g., $\{W1, A1, W2, A2\}$, and $\{W3, A3\}$. As may be appreciated from FIG. 8, these groups should only correspond to the containers 802, 804, and, as affinity groups, are applicable at all levels of deployment.

Figure 11:
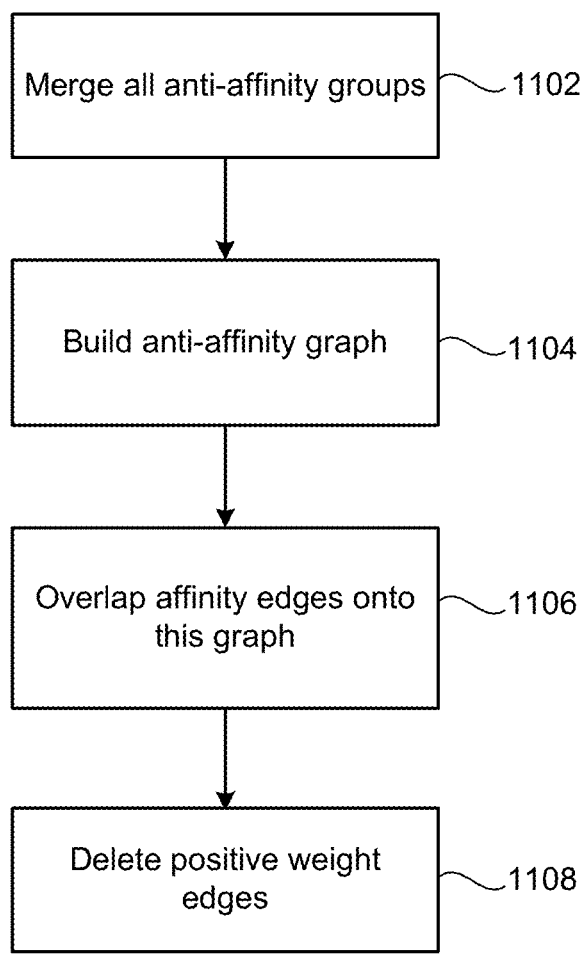
FIG. 11 is a flowchart illustrating, in more detail, a group merge operation of the flowchart of FIG. 10.

FIG. 11 is a flowchart 1100 illustrating a more detailed example implementation of the group merging operation 1010 of FIG. 10. As described in detail below with respect to FIGS. 12-16, the result of the group merging operations of FIG. 11 is an anti-affinity graph, which may easily be translated into a placement plan for deploying the service 104.

In the example of FIG. 11, all anti-affinity groups are merged (1102). For example, the group manager 124 of FIG. 1 may be configured to execute associated operations for merging all anti-affinity groups. In this regard, reference is made for the sake of example to the anti-affinity groups described above with respect to the availability container set 600 and the QoS container set 700. Specifically, these anti-affinity groups may be used to illustrate the point that two (or more) anti-affinity groups containing the same elements may be added together. That is, a new group may be derived through the merging of two such groups having the same elements, and having an anti-affinity level that is the higher (or highest) of the anti-affinity levels of the groups being combined. Moreover, a priority value of the new group is simply the sum of the priority values of the groups being combined.

For example, with respect to the availability container set, an anti-affinity group $\{W1, A2\}_R$ is described above as being included in the set of anti-affinity groups related to the availability container set, and, as described, indicates that W1 and A2 should not be placed in a single/same rack, and is associated with a priority value of −0.3 (that is, anti-affinity groups should be understood to have negative priority values, indicating an extent to which the elements of the group should be prevented from being deployed together at the relevant level). Similarly, from the QoS container set, the same group $\{W1, A2\}_R$ at the same rack level, is included, but with a priority value of −0.25. Then, by merging these two anti-affinity groups, the result is an anti-affinity group $\{W1, A2\}_R$, at a rack level, and with a combined priority value of −0.55. In this example, the level was the same for both anti-affinity groups (i.e., rack level), but, as referenced above, in other examples in which the levels of the two or more anti-affinity groups to be merged are different, then the resulting merged anti-affinity group will be associated with the maximum level of the groups being merged.

Following the merging of the anti-affinity groups, an initial anti-affinity graph may be built (1104). An example of such an anti-affinity graph is provided with respect to FIG. 12. In such an anti-affinity graph, each group will be considered as an edge of the graph (so that each edge has a corresponding priority value), while the various elements of the relevant container sets form the nodes of the graph.

Thereafter, as described and illustrated below with respect to a difference between FIGS. 12 and 13, affinity groups may be overlapped onto the initial anti-affinity graph (1106), and any resulting positive edge weights (i.e., affinity edges) may be deleted (1108). In other words, for each edge in the anti-affinity graph, elements connected by that edge in the affinity groups may be identified. Then, if both the elements are found in the affinity groups, then the priority value of that affinity group may be added to the edge priority value. Since the affinity edge values will be positive, while the anti-affinity edge values will be negative, it may occur that a total, resulting edge value of an affinity edge overlapped on an anti-affinity edge may be positive or negative. In the case that the result is positive, then the edge represents an affinity, on net, between the two elements, and may therefore be deleted from the overall anti-affinity graph.

Figure 12:
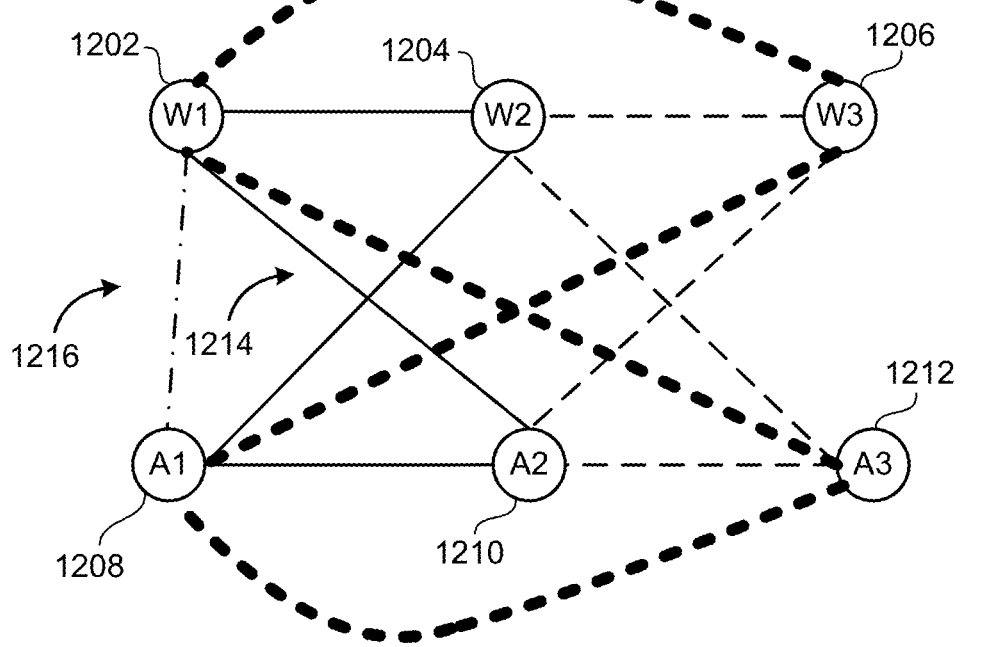
FIG. 12 is an anti-affinity graph used in the operations of the flowchart of FIG. 11, and described with respect to the example of FIGS. 5-9.

Thus, FIG. 12 illustrates an anti-affinity graph 1200, in which the nodes 1202-1212 correspond to the various service elements W1, W2, W3, A1, A2, A3. In the anti-affinity graph 1200, as described, each edge connecting any two of the nodes represents an anti-affinity group, and therefore is associated with a specific level. For example, an edge 1214 represents the anti-affinity group $\{W1, A2\}_R$ which was described above with respect to FIG. 11 as representing a merging of two anti-affinity groups at the rack level and having the elements W1, A2 included therein. As described above, and as illustrated in the example of FIG. 12, the resulting edge 1214 therefore has a combined priority value of −0.3+−0.25, or −0.55 total. Although not every edge of the anti-affinity graph 1200 is enumerated in FIG. 12, each edge of the graph 1200 may easily be associated with a corresponding level and priority level value, using the illustrated legend provided in FIG. 12.

In particular, however, an edge 1216 represents an anti-affinity group $\{W1, A1\}_H$ which, as illustrated, represents an anti-affinity group including W1, A1, existing at the host level and having a priority level value −0.3. As may be observed, this edge (i.e., group) was described above as a group of the availability container set 600.

Meanwhile, as described above with respect to the connectivity container set 800, and with reference to the decision table 900 of FIG. 9, the elements W1, A1 are included within an affinity group having a priority value of 0.45. Therefore, by virtue of the operation 1106 of FIG. 11, an affinity edge corresponding to this affinity group, and therefore having a priority level value of 0.45 may be overlaid on the edge 1216. As a result, a combined edge value of the two edges will be 0.45-0.3, resulting in a net value of 0.15. Because this edge therefore has a positive edge value, in accordance with the operation 1108 of FIG. 11, it may be removed, resulting in the finalized or final anti-affinity graph 1300 of FIG. 13.

Figure 13:
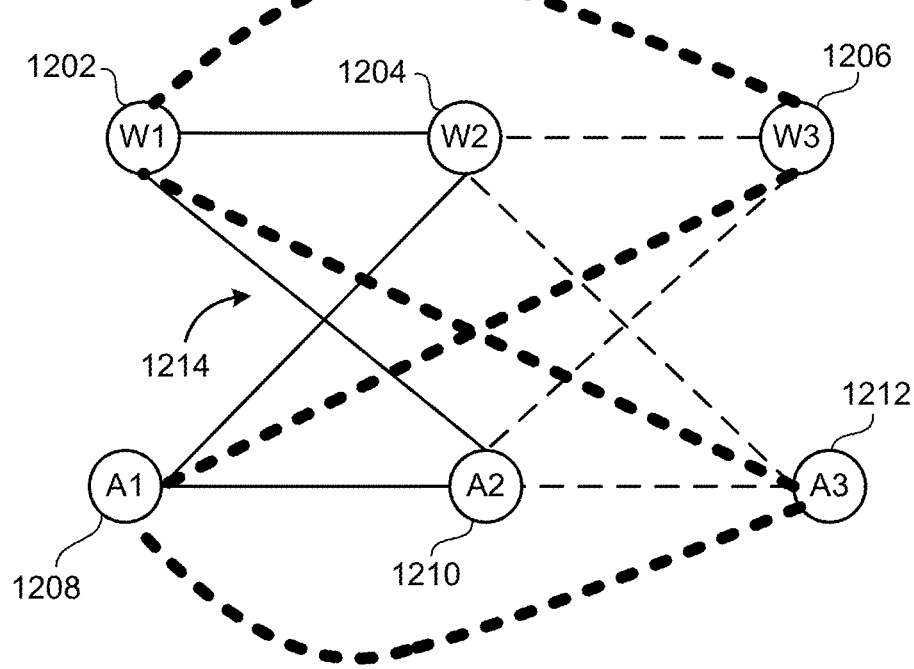
FIG. 13 is the anti-affinity graph of FIG. 12, modified to account for a corresponding affinity group.
Figure 14:
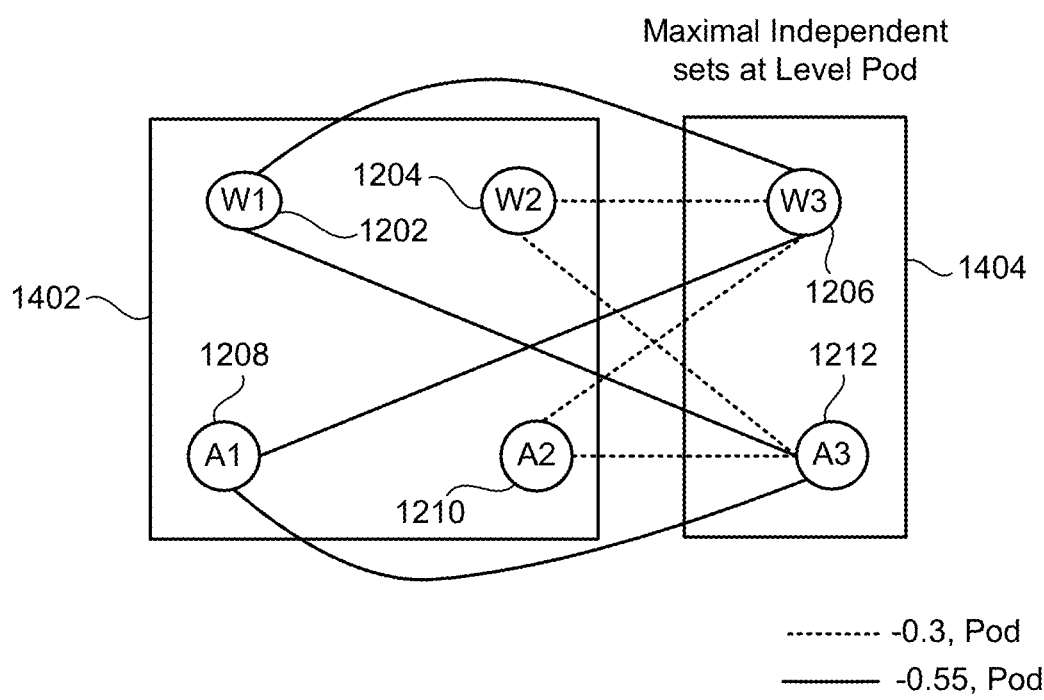
FIG. 14 is a block diagram illustrating a determination of maximal independent sets at a first anti-affinity level, used in the anti-affinity graph of FIG. 13.
Figure 15:
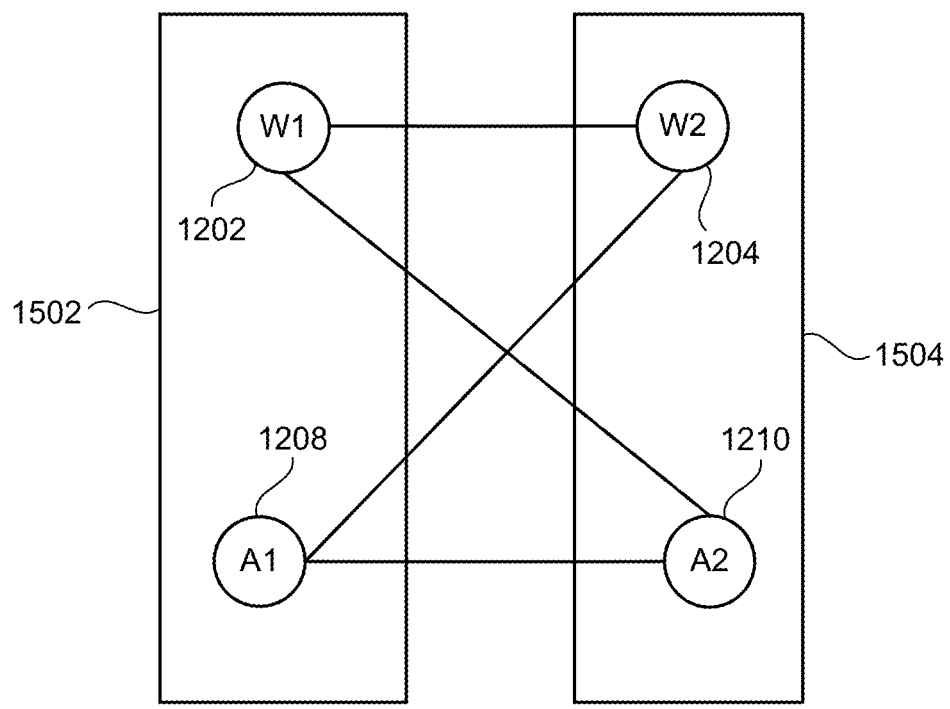
FIG. 15 is a block diagram illustrating determination of maximal independent sets at a second, lower level, with respect to the anti-affinity graph of FIG. 13.

Thereafter, the resulting, merged groups represented by the anti-affinity graph of FIG. 13 may be utilized to generate a placement plan for deployment of the service 104, as referenced above with respect to the operation 1012 of FIG. 10. Specifically, the various nodes/elements 1202-1212, at each level and beginning with the highest level, are divided into disjoint, maximal independent sets.

In the example of FIG. 13, the highest level is the pod level. Therefore, as shown in the anti-affinity graph 1400 of FIG. 14, maximal independent sets 1402 and 1404, i.e., sets of elements in which no element is connected to any other, may be identified at the pod level. In other words, for purposes of related operations, only the pod-level edges/groups are considered, and maximal independent sets are identified, where inclusion of elements within such a maximal independent set implies that the elements must be placed in different containers at the level being considered, and that all elements in that maximal independent set are placed in a container at that level.

For example, with regard to the maximal independent set 1402, it may be observed that the included elements W1, W2, A1, A2 are not directly connected from any of one another by an edge. Similarly, elements W3, A3 are not connected by an edge, and therefore form a second maximal independent set 1404. As shown and described in detail below, the maximal independent sets 1402, 1404 may therefore correspond to placement at the relevant level (i.e., here, the pod level).

The same operations may then be performed in a next-lower level. For example, as shown in the graph 1500 of FIG. 15, the same operation may be performed at the rack level. As may be observed from the example, the elements W1, A1 form a maximal independent set 1502, while the elements W2, A2 form a second maximal independent set 1504. The process of identifying maximal independent sets, in this example, terminates at this point, because no further inter-level edges are present.

Thus, the vertices of the final anti-affinity graph are divided into two sets at the pod level, i.e., {W1, A1, W2, A2}, and {W3, A3}. Meanwhile, the set 1402 corresponding to {W1, A1, W2, A2} may be further divided into two sets at the rack level, i.e., {W1, A1} and {W2, A2}.

Figure 16:
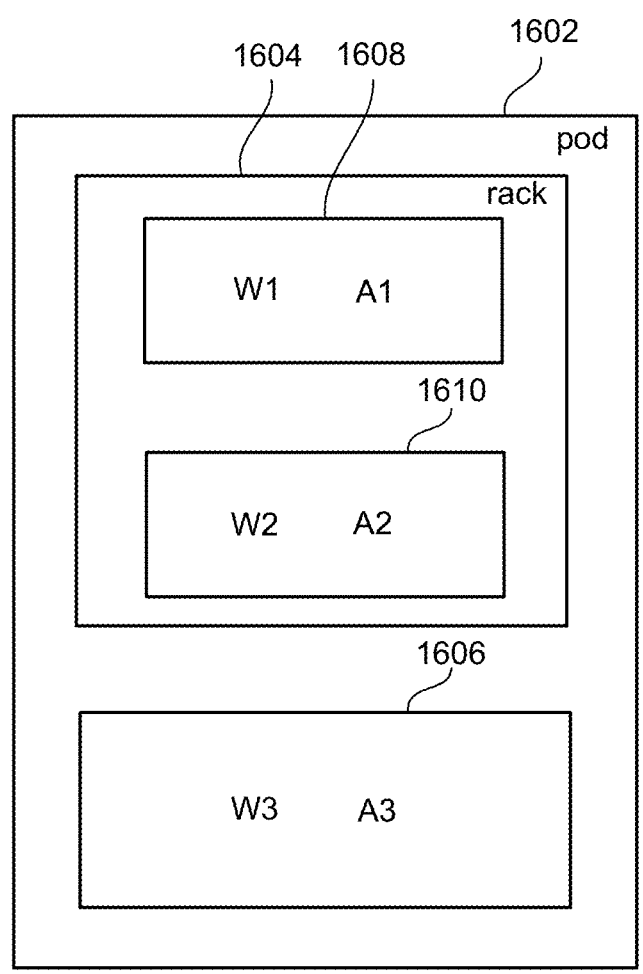
FIG. 16 is a block diagram of a placement plan derived from the maximal independent sets of FIGS. 14 and 15.

Thus, FIG. 16 illustrates a block diagram 1600 of a placement plan resulting from the above-described operations of FIGS. 10-15. Specifically, as illustrated, at a pod level 1602, two racks 1604, 1606 are provided. As may be observed, the first rack 1604 includes an entirety of the first maximal independent set {W1, A1, W2, A2}, while the second rack 1606 includes the second maximal independent set at the pod level {W3, A3}. As also shown, the rack 1604 includes elements W1, A1 at the host level 1608, and W2, A2 at a second host 1610.

Thus, the placement plan of FIG. 16 may be utilized to execute an actual deployment of the various service elements within the data center placement model 1400 of FIG. 4. For example, the placement plan of FIG. 16 indicates that W1, A1, W2, A2 should be placed in one pod, e.g., the first pod 408 of the first location 404, while service elements W3, A3 should be placed in a different pod, e.g., the second pod 410 of the first location 404. More generally, the data center placement model 400 may be searched for a location of the locations 404, 406 (i.e., in order to begin with a level higher than the highest level of the placement plan, i.e., the pod level), to thereby identify at least two pods having sufficient capacity (e.g., available CPU, memory capacity for hosting the individual elements).

Similarly, at a lower level, e.g., within the first pod 408 of the first location 404, elements W1, A1 should be placed in one rack (e.g., the first rack 414 of the first pod 408), while W2, A2 should be placed in a different rack (e.g., the second rack 416 of the first pod 408). So similarly to the comments above, at a pod level of the selected location, a query may be performed for at least two racks with available capacity.

In more specific examples, when querying a specific pod for at least two racks included therein with necessary capacity for a desired deployment, it may occur that two sets of racks having a desired capacity may not exist at the current time. In that case, the placement engine 124 may backtrack, i.e., by moving one level up and querying for, in this case, another pod, so as to continue the search for the two desired racks. In general, such backtracking may occur until a suitable container is identified. If no such container may be found, then the placement may not be satisfied at the time, and may be reported back as a failed attempt as associated failure cause. Conversely, it may occur that more than one possibility exists for a desired deployment at a given level, so that various additional strategies may be implemented for selecting between the available options. For example, selections may be made based on which of the available options is useful, i.e., has the most, or highest percentage, available capacity.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one processor, the system comprising:

a container set manager configured to cause the at least one processor to instantiate an Application Placement Model (APM) to obtain an APM instance, the APM including a container set configured to specify a constraint associated with deployment of a service within at least one data center, wherein the APM instance includes a plurality of container sets instantiated from the container set of the APM, including a first container set associated with a first constraint and specifying service elements of the service grouped into an affinity group, and a second container set associated with a second constraint and specifying the service elements grouped into an anti-affinity group;

a decision table manager configured to cause the at least one processor to determine a decision table of the APM instance specifying relative priority levels of the first container set and the second container set relative to one another with respect to the deployment;

a group manager configured to cause the at least one processor to combine the affinity group and the anti-affinity group, based on the relative priority levels, to obtain a merged group of the APM instance; and a placement engine configured to cause the at least one processor to determine an instance of a data center placement model (DPM) representing the at least one data center, and generate a placement plan for the deployment, based on the APM instance and the DPM instance.

2. The system of claim 1, wherein the deployment includes deployment of the service elements of the service using corresponding hosts of the at least one data center, and wherein each container set includes at least one container that specifies a manner and/or extent to which individual ones of the service elements should or should not be deployed in proximity to one another within the at least one data center.

3. The system of claim 2, wherein the APM instance includes the first container set including at least one container specifying at least two service elements of the service elements, and the second container set including at least another container specifying the at least two service elements of the service elements.

4. The system of claim 2, wherein the affinity group expresses a preference for the service elements to be deployed in proximity to one another, and the anti-affinity group expresses a preference for the service elements to be prevented from being deployed together at a specified level of deployment levels of the data center placement model.

5. The system of claim 4, wherein the APM instance further includes an additional anti-affinity group of a third container set, and wherein the group manager is further configured to merge the anti-affinity group and the additional anti-affinity group, and construct an anti-affinity graph therefrom, in which the service elements are included as nodes and each edge of the anti-affinity graph linking two nodes corresponds to one of the anti-affinity group and the additional anti-affinity group.

6. The system of claim 5, wherein each edge has a priority value determined by a priority value of one or more corresponding container sets as determined from the decision table.

7. The system of claim 6, wherein the group manager is further configured to add at least one affinity edge to the anti-affinity graph, wherein each edge corresponding to an anti-affinity group has a negative priority value and the at least one affinity edge has a positive priority value, and priority values of any overlapping affinity and anti-affinity edges are added together.

8. The system of claim 7, wherein the group manager is further configured to remove any positive priority value edges to obtain a final anti-affinity graph and analyze the final anti-affinity graph to identify any maximal independent set therein, at each level of the deployment level, beginning with the highest level.

9. The system of claim 8, wherein the placement engine is further configured to associate any maximal independent set and associated level to the corresponding level of the DPM instance, to thereby obtain the placement plan.

10. A method comprising:
instantiating an Application Placement Model (APM) to obtain an APM instance, the APM including a container set configured to specify a constraint associated with deployment of a service within at least one data center, wherein the APM instance includes a plurality of container sets instantiated from the container set of the APM, including a first container set associated with a first constraint and specifying service elements of the service grouped into an affinity group, and a second container set associated with a second constraint and specifying the service elements grouped into an anti-affinity group;

determining a decision table of the APM instance specifying relative priority levels of the first container set and the second container set relative to one another with respect to the deployment;
combining the affinity group and the anti-affinity group, based on the relative priority levels, to obtain a merged group of the APM instance;
determining an instance of a data center placement model (DPM) representing the at least one data center; and
generating a placement plan for the deployment, based on the APM instance and the DPM instance.

11. The method of claim 10, wherein the deployment includes deployment of the service elements of the service using corresponding hosts of the at least one data center, and wherein each container set includes at least one container that specifies a manner and/or extent to which individual ones of the service elements should or should not be deployed in proximity to one another within the at least one data center, and wherein the affinity group expresses a preference for the service elements to be deployed in proximity to one another, and the anti-affinity group expresses a preference for the service elements to be prevented from being deployed together at a specified level of deployment levels of the data center placement model.

12. The method of claim 11, wherein the APM instance further includes an additional anti-affinity group of a third container set, and wherein the grouping further comprises:
merging the anti-affinity group and the additional anti-affinity group; and
constructing an anti-affinity graph therefrom, in which the service elements are included as nodes and each edge of the anti-affinity graph linking two nodes corresponds to one of the anti-affinity group and the additional anti-affinity group.

13. The method of claim 12, wherein each edge has a priority value determined by a priority value of one or more corresponding container sets as determined from the decision table.

14. The method of claim 12, further comprising identifying any maximal independent set within the anti-affinity graph, at each level of the deployment level, beginning with the highest level.

15. The method of claim 14, wherein the generating the placement plan comprises associating any maximal independent set and associated level to the corresponding level of the DPM instance, to thereby obtain the placement plan.

16. A computer program product including instructions recorded on a non-transitory computer readable storage medium and configured to cause at least one processor to:
instantiate an Application Placement Model (APM) to obtain an APM instance, the APM including a container set configured to specify a constraint associated with deployment of a service within at least one data center, wherein the APM instance includes a plurality of container sets instantiated from the container set of the APM, including a first container set associated with a first constraint and specifying service elements of the service grouped into an affinity group, and a second container set associated with a second constraint and specifying the service elements grouped into an anti-affinity group;
determine a decision table of the APM instance specifying relative priority levels of the first container set and the second container set relative to one another with respect to the deployment;

combine the affinity group and the anti-affinity group, based on the relative priority levels, to obtain a merged group of the APM instance;

determine an instance of a data center placement model (DPM) representing the at least one data center; and generate a placement plan for the deployment, based on the APM instance and the DPM instance.

17. The computer program product of claim 16, wherein the deployment includes deployment of the service elements of the service using corresponding hosts of the at least one data center, and wherein each container set includes at least one container that specifies a manner and/or extent to which individual ones of the service elements should or should not be deployed in proximity to one another within the at least one data center, and wherein the affinity group expresses a preference for the service elements to be deployed in proximity to one another, and the anti-affinity group expresses a preference for the service elements to be prevented from being deployed together at a specified level of deployment levels of the data center placement model.

18. The computer program product of claim 17, wherein the APM instance further includes an additional anti-affinity group of a third container set, and wherein the instructions, when executed, are further configured to:

merge the anti-affinity group and the additional anti-affinity group; and construct an anti-affinity graph therefrom, in which the service elements are included as nodes and each edge of the anti-affinity graph linking two nodes corresponds to one of the anti-affinity group and the additional anti-affinity group.

19. The computer program product of claim 18, wherein the instructions, when executed, are further configured to identify any maximal independent set within the anti-affinity graph, at each level of the deployment level, beginning with the highest level.

20. The computer program product of claim 19, wherein the instructions, when executed, are further configured to associate any maximal independent set and associated level to the corresponding level of the DPM instance, to thereby obtain the placement plan.

* * * * *